United States Patent

[11] 3,552,604

[72] Inventor Richard A. Gordon
 95 W. 3rd St., Freeport, N.Y. 11520
[21] Appl. No. 720,001
[22] Filed Apr. 9, 1968
[45] Patented Jan. 5, 1971

[54] CONTAINER WITH ELASTIC MEMORY TOWARDS SQUEEZED POSITION
 6 Claims, 7 Drawing Figs.
[52] U.S. Cl. .................................................... 222/95
[51] Int. Cl. .................................................... B65d 35/28
[50] Field of Search........................................... 222/95,
 107, 214, 215, 92, 212; 122/(Inquired);
 264/(Inquired); 18/(Coll. tube digest), 58.7

[56] References Cited
 UNITED STATES PATENTS
 2,061,796 11/1936 Roches........................ 222/559
 2,816,690 12/1957 Lari............................. 222/215
 2,966,703 1/1961 Harman....................... 18/58.7
 2,743,038 4/1956 Ferries........................ 222/95

Primary Examiner—Stanley H. Tollberg
Attorney—I. Walton Bader

ABSTRACT: An integrally molded squeezable plastic tube is shown which has a body which is made of material having a "memory" and includes a pair of opposed walls. The walls are so molded so that they normally assume their squeezed position. Each of the walls has a pair of opposite end portions. An intervening portion extends downwardly from each of the end portions. The adjacent end portions at each end of the opposed walls are joined to one another. The adjacent intermediate portions extending from one end portion of the walls are molded so that they are normally in closely adjacent relationship with one another while the adjacent intermediate portions extending from the opposite end portion of the walls are molded so that they are normally spaced from one another. An exit opening within the tube is provided adjacent the junction between the normally spaced walls and a cap is provided normally closing the exit opening.

A method of making the tube described above is also shown. This includes the steps of obtaining a mold which has a dividing member which is formed with a relatively narrow elongated portion at one end thereof and a widened portion at the opposite end. A liquid thermoplastic material is molded about the dividing member and allowed to harden. The formed tube is then removed from the mold.

PATENTED JAN 5 1971 3,552,604

INVENTOR.
RICHARD A. GORDON
BY
J. Walter Barker
ATTORNEY

CONTAINER WITH ELASTIC MEMORY TOWARDS SQUEEZED POSITION

DESCRIPTION OF THE INVENTION

This invention relates to an integrally molded squeezable plastic tube for toothpaste and the like and to a method of making the same.

Tubes for containing toothpaste and the like have been conventionally made of flexible metal. Metal prices have, in the past few years, been rising substantially and experiments have been made to mold tubes of plastic material. Generally the plastic material employed has been polyethylene, polypropylene, or other similar moldable thermoplastic materials. However thermoplastic materials generally have a "memory" and will normally return to their unsqueezed condition. For example, if a tube is molded of such material and is thereafter squeezed the material will, after a time, return to unsqueezed condition. As a result the user of such a tube must resqueeze "air" before the material involved is removed from the tube.

In the tube of this invention, on the other hand, the "memory" of the material, for the greater part of its length, tends to bring the tube into its normal squeezed position. In addition the construction of the tube permits a slight pressure to be applied to the contents so that ease of squeezing is provided.

On the other hand, the tube is also made, at one end, in normal spaced relationship so that the contents thereof are not disposed therein under pressure.

With these and other objects in mind reference is made to the accompanying drawings which are made a part of this specification.

Figure 1:
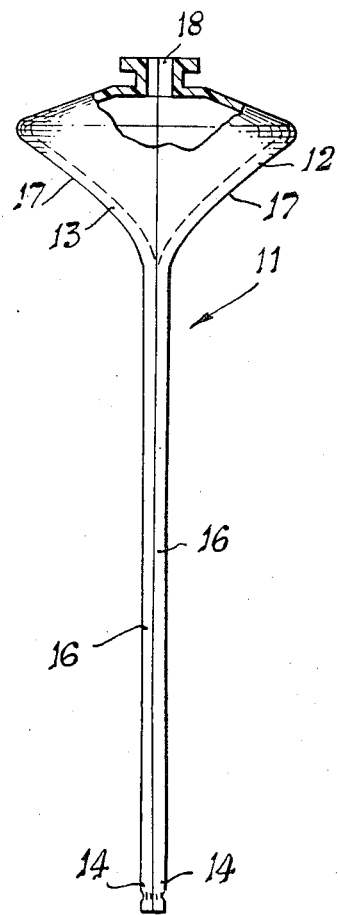
FIG. 1 is a side view, partly in section, of a tube made in accordance with this invention before the tube is filled with its contents.
Figure 2:
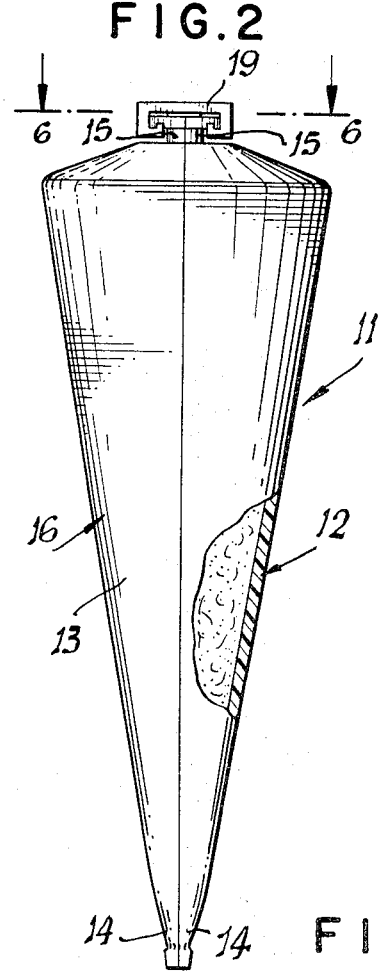
FIG. 2 is a side view, partly in section, of the tube of this invention filled with its contents and sealed on one end thereof.
Figure 3:
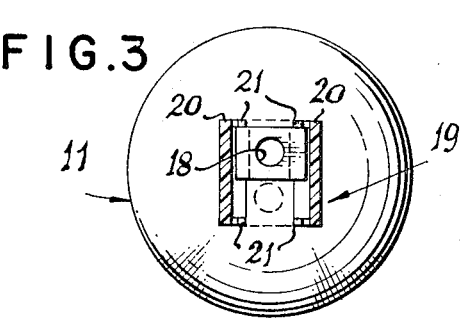
FIG. 3 is a plan view, partly in section, of a slidable closure cap that can be used in connection with the tube of this invention. In this view the cap is in closed position.
Figure 4:
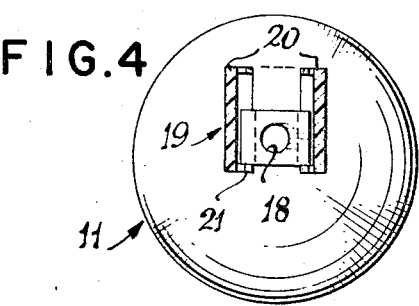
FIG. 4 is a view similar to that of FIG. 3 but with the cap in open position.
Figure 5:
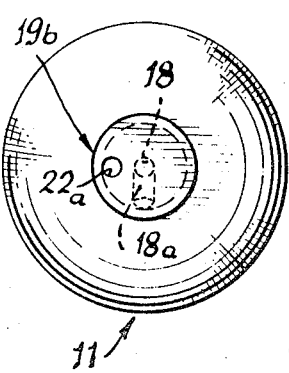
FIG. 5 is a plan view of an alternative type of cap which may be employed in connection with the tube of this invention.
Figure 6:
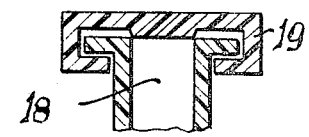
FIG. 6 is a sectional view of the cap of this invention taken along lines 6–6 of FIG. 2.
Figure 7:
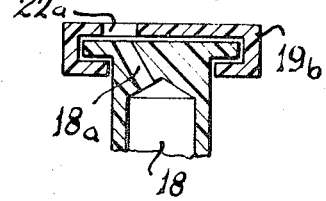
FIG. 7 is a view similar to that of FIG. 6 but showing an alternative type of cap which may be utilized in connection with this invention.

The invention will now be further described by reference to the specific form thereof as set forth in the accompanying drawings. In this connection, however, the reader is cautioned to note that the specific forms of this invention as set forth in the specification herein are for illustrative purposes and for purposes of example only. Various changes and modifications could obviously be made within the spirit and scope of this invention.

Now referring to the specific forms of this invention as shown in the drawings for a detailed description thereof, the tube 11 of this invention is formed with a pair of opposite wall members 12 and 13. Each of wall members 12 and 13 are provided with a pair of end portions 14 at one end thereof and a pair of opposite end portions 15. An intermediate portion 16 extends upwardly from each of portions 14 and an intermediate portion 17 extends downwardly from each of intermediate portions 15. Tube 11 is normally molded so that the normal position of portions 16 is closely adjacent to one another while the normal positions of portion 17 are spaced from one another. In the normal use of tube 11 portions 14 are sealed to one another.

Adjacent portions 15 is an exit opening 18 which is surrounded by a cap 19. Alternatively a cap 19a can be employed which is slidably disposed within a raceway 20 and includes an opening 22 therewithin. Opening 22 is registerable with opening 18 and the slidable movement of cap 19a is stopped by stops 21 on either side of raceway 20. Alternatively a form of cap 19b may be employed which includes an opening 22a which is disposable selectively with opening 18a. Where cap 19b is employed it will be turnable so as to put members 18a and 22a into and out of registration with one another.

The tube of this invention can either be filled through opening 18 with portions 14 sealed to one another or, preferably, portions 14 are normally molded in open relationship. The material 23 which is disposed within tube 11 is then inserted under pressure through the open portion between end portions 14 of walls 12 and 13. After the tube is filled with the material portions 14 are sealed to one another.

The tube of this invention is molded in an injection mold which includes a dividing member (not shown) which is formed with a relatively narrow elongated portion at one end thereof and a widened portion at the opposite end thereof. A liquid thermoplastic material is placed within the mold and allowed to harden. The tube is then removed from the mold and has a configuration as shown in FIG. 1.

The materials of which the tube of this invention may be molded are any moldable thermoplastic material. As examples, reference is made to polyethylene resin, polypropylene resin, nylon resin, or any similar flexible thermoplastic resin. The material involved is not critical in the manufacture of the invention described herein.

The foregoing sets forth the manner in which the objects of this invention are achieved.

I claim:

1. An integrally molded squeezable plastic container member made of material having a memory having a body formed with a pair of opposed wall members normally molded so that the memory of the material corresponds to the squeezed position thereof, each of said wall members having a pair of opposite end portions and an intervening portion extending axially from each end portion and connected to one another, the adjacent end portions at the ends of said wall members being joined to one another, the walls of one of the adjacent intermediate portions being normally in closely adjacent relationship with one another and the walls of the other adjacent intermediate portions being spaced from one another, exit means within said container and means for selectively blocking said exit means so that the quantity of material in said container can be readily discernible.

2. An integrally molded plastic tube as described in claim 1 said exit means being an opening at the end of said tube having normally spaced walls.

3. An integrally molded plastic tube as described in claim 2 including cap means overlying said opening and movable into open and closed relationship.

4. An integrally molded plastic tube as described in claim 3 said opening being provided within the joined portions of the walls of said tube.

5. An integrally molded plastic tube as described in claim 4 said opening being angularly disposed and said cap having an offset mating opening.

6. An integrally molded plastic tube as described in claim 4 said cap being slidably movable and provided with an opening therewithin movable into and out of registration with the opening within said tube.